U S008483297B2

(12) United States Patent
Rezvani et al.

(10) Patent No.: US 8,483,297 B2
(45) Date of Patent: Jul. 9, 2013

(54) MULTIFUNCTIONAL SIGNAL TRANSFORM ENGINE

(75) Inventors: Behrooz Rezvani, San Ramon, CA (US); Farrokh Farrokhi, San Ramon, CA (US)

(73) Assignee: Quantenna Communications, Inc., Fremont, CA (US)

( * ) Notice: Subject to any disclaimer, the term of this patent is extended or adjusted under 35 U.S.C. 154(b) by 597 days.

(21) Appl. No.: 12/599,682

(22) PCT Filed: May 12, 2008

(86) PCT No.: PCT/US2008/063481
§ 371 (c)(1),
(2), (4) Date: Jun. 16, 2010

(87) PCT Pub. No.: WO2008/141311
PCT Pub. Date: Nov. 20, 2008

(65) Prior Publication Data
US 2010/0303160 A1    Dec. 2, 2010

Related U.S. Application Data

(60) Provisional application No. 60/917,276, filed on May 10, 2007.

(51) Int. Cl.
*H04K 1/10* (2006.01)
(52) U.S. Cl.
USPC ........... 375/260; 375/259; 375/262; 375/267; 375/271; 375/316

(58) Field of Classification Search
USPC ............... 375/259, 260, 262, 267, 271, 295, 375/299, 300, 316, 322, 340, 342, 344, 346, 375/350
See application file for complete search history.

(56) References Cited

U.S. PATENT DOCUMENTS

| 4,138,730 | A | 2/1979 | Ali | |
|---|---|---|---|---|
| 6,304,887 | B1 * | 10/2001 | Ju et al. | 708/404 |
| 7,333,422 | B2 * | 2/2008 | Amer | 370/210 |
| 8,107,357 | B2 * | 1/2012 | Amer | 370/210 |
| 8,279,746 | B2 * | 10/2012 | Juang | 370/210 |
| 2006/0215778 | A1 | 9/2006 | Murthy et al. | |
| 2006/0268675 | A1 * | 11/2006 | Cho et al. | 370/210 |
| 2007/0089015 | A1 * | 4/2007 | Saul | 714/746 |
| 2007/0180011 | A1 * | 8/2007 | Lee et al. | 708/400 |
| 2007/0226285 | A1 * | 9/2007 | Goswami et al. | 708/404 |
| 2008/0107188 | A1 * | 5/2008 | Kennedy et al. | 375/259 |
| 2008/0155003 | A1 * | 6/2008 | Lai et al. | 708/404 |
| 2008/0208944 | A1 * | 8/2008 | Sung et al. | 708/404 |
| 2010/0046599 | A1 * | 2/2010 | Kim et al. | 375/233 |
| 2011/0102258 | A1 * | 5/2011 | Underbrink et al. | 342/357.47 |

OTHER PUBLICATIONS

International Search Report PCT/US2008/63481 dated Jul. 17, 2008.

* cited by examiner

*Primary Examiner* — Hirdepal Singh (57) ABSTRACT

A technique involves using a fast Fourier transform (FFT) module to transform multiple different types of signals. This may be accomplished using one or more of three techniques: logic within the FFT module can enable different processing depending upon a processing state, the FFT module can be called iteratively to transform a signal that is larger than the FFT implemented in the FFT module, the FFT module can be used for parallel transformation of multiple signals that are smaller than the FFT implemented in the FFT module. Thus, a single FFT module can be used to transform a first type of signal (e.g., WIFI) and a second type of signal (e.g., GPS) if configured according to the technique.

6 Claims, 8 Drawing Sheets

$$\sum_{n=0}^{N-1} x_n e^{j\frac{2\pi}{N}kn}$$

$$= \sum_{n=0}^{N/2-1} x_n e^{j\frac{2\pi}{N}kn} + \sum_{n=N/2}^{N-1} x_n e^{j\frac{2\pi}{N}kn}$$

$$= \sum_{n=0}^{N/2-1} x_n e^{j\frac{2\pi}{N}kn} + \sum_{n=0}^{N/2-1} x_{n+N/2} e^{j\frac{2\pi}{N}k(n+N/2)}$$

$$= \sum_{n=0}^{N/2-1} x_n e^{j\frac{2\pi}{N}kn} + e^{j\pi k} \sum_{n=0}^{N/2-1} x_{n+N/2} e^{j\frac{2\pi}{N}kn}$$

$$= FFT(x_n) + FFT(x_{n+N/2})$$

MULTIFUNCTIONAL SIGNAL TRANSFORM ENGINE

This application claims priority to U.S. Provisional Patent Application No. 60/917,276 filed May 10, 2007, which is hereby incorporated by reference in its entirety.

BACKGROUND

A WIFI enabled device transmits and receives WIFI signals during communication. Most WIFI enabled devices processes signals in frequency domain, while the WIFI signals are time domain in nature. Therefore, WIFI devices require specific engines for converting received time domain WIFI signals to frequency domain for internal processing, and specific engines for converting internal frequency domain data to time domain WIFI signals before transmitting.

In order for a typical WIFI enabled device to provide additional wired or wireless communications, such as Global Positioning System (GPS) tracking, Bluetooth communication, or Power Line Communication (PLC), etc, additional devices or components must be added to the WIFI enabled devices for performing these different functions. It is usually costly in designing devices to incorporate multiple wired or wireless communication capabilities. Even reusing a small subset of components for different types of signals could yield advantages.

SUMMARY

In various examples, one or more of the above-described problems have been reduced or eliminated, while other examples are directed to other improvements. WIFI is provided as one example of an applicable device. The following examples and aspects thereof are described and illustrated in conjunction with systems, tools, and methods that are meant to be exemplary and illustrative, not limiting in scope.

A Fast Fourier transform (FFT) module can transform multiple different types of signals. This may be accomplished using one or more of three techniques: logic within the FFT module can enable different processing depending upon a processing state, the FFT module can be called iteratively to transform a signal that is larger than the FFT implemented in the FFT module, the FFT module can be used for parallel transformation of multiple signals that are smaller than the FFT implemented in the FFT module. Thus, a single FFT module can be used to transform a first type of signal (e.g., WIFI) and a second type of signal (e.g., GPS).

An FFT module may implement an FFT or an IFFT. It may be advantageous to include a first FFT module implementing an FFT, coupled to a frequency domain signal processing engine, and a second FFT module implementing an IFFT.

BRIEF DESCRIPTION OF THE DRAWINGS

One or more embodiments of the present invention are illustrated by way of examples and not limitation in the figures of the accompanying drawings, in which like references indicate similar elements and in which.

DETAILED DESCRIPTION

A method and apparatus for providing multifunctional signal transformation engine are described. References in this specification to "an embodiment", "one embodiment", or the like, mean that the particular feature, structure or characteristic being described is included in at least one embodiment of the invention. Occurrences of such phrases in this specification do not necessarily all refer to the same embodiment.

Orthogonal Frequency-Division Multiplexing (OFDM) has been designed as a popular scheme for wide band digital communication for many wired and wireless applications. Common wired OFDM applications include DSL broadband access, Power Line Communication (PLC), etc. Wireless applications of OFDM include wireless LAN radio interfaces (IEEE 802.11a, g, n); digital radio system; digital TV system; mobile TV system, cellular communication systems (Flash-OFDM and 3GPP); wireless MAN (WiMAX); Mobile Broadband Wireless Access (MBWA) standard (Mobile WiMAX); wireless Personal Area Network (PAN) ultraband (Bluetooth); etc.

The heart of a typical OFDM enabled processor includes a FFT engine for converting time domain signal obtained from device receiver to frequency domain data for internal processing. Some OFDM processors also include an Inverse FFT (IFFT) engine for converting frequency domain data to time domain signals before sending the signals via a transmitter. Therefore, it is advantageous to develop FFT or IFFT engines that are capable of processing multiple types of OFDM applications. Further, it is advantageous to configure one OFDM processor, which is specifically designed to provide one type of OFDM communication, to nevertheless provide other types of OFDM communication with minimum modifications.

Figure 1:
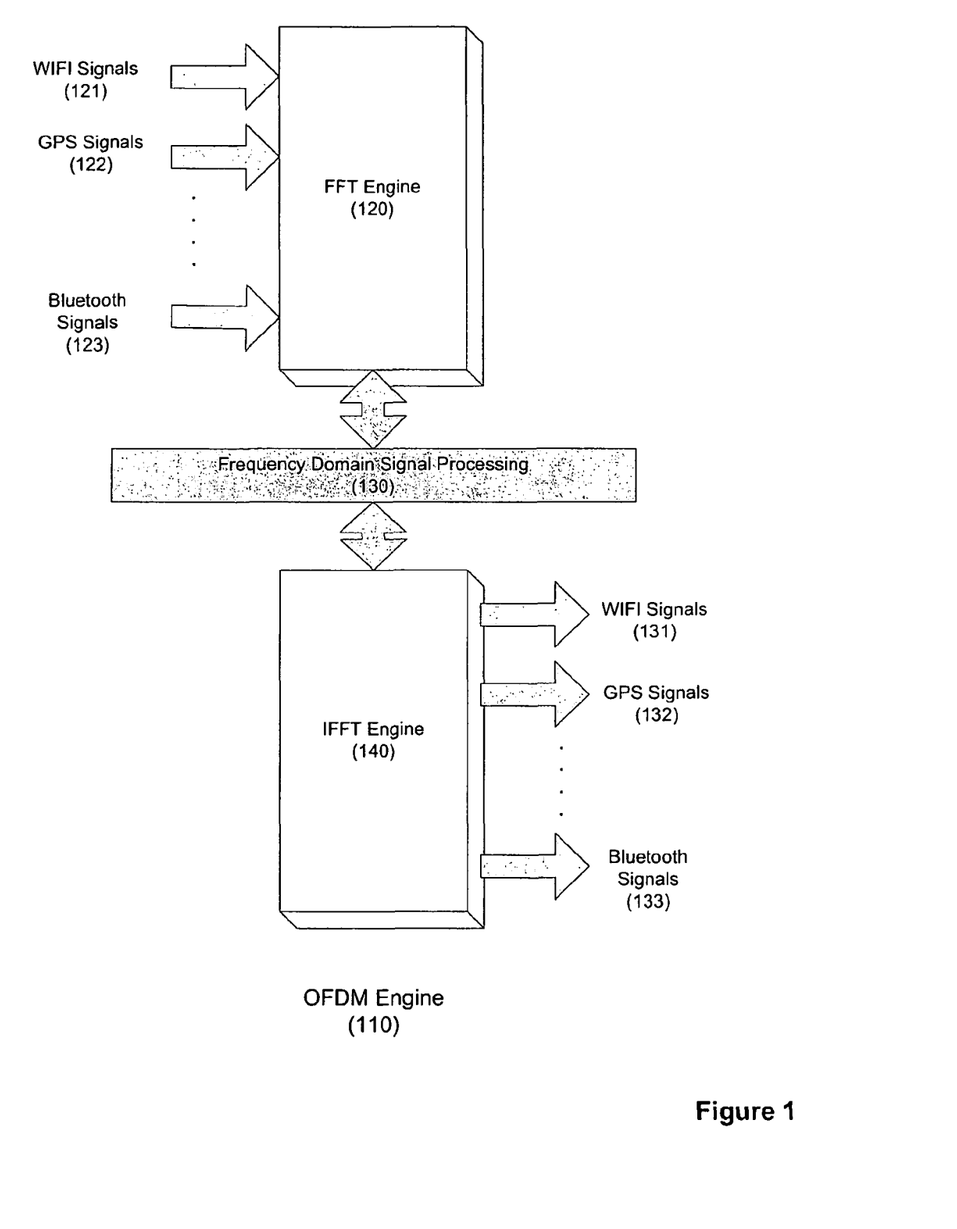
FIG. 1 illustrates an example of an OFDM engine suitable for supporting multiple OFDM applications.

FIG. 1 illustrates an example of an OFDM engine 110 suitable for supporting multiple OFDM applications. The OFDM Engine 110 can be originally designed to support one specific OFDM application, such as WIFI. It can also be a general purpose OFDM engine that is developed to support multiple OFDM applications. The OFDM engine 110 can be installed in a mobile portable device such as a PDA, a cell phone, etc, or in a non-portable device such as a router, etc. The OFDM Engine 110 includes a FFT Engine 120. Optionally the OFDM Engine 110 may include a Frequency Domain Signal processing component 130, an IFFT Engine 140, or other additional components.

A FFT engine 120 performs Fast Fourier Transform (FFT) on the received signals, and generates domain data. A FFT is an efficient algorithm to perform the Discrete Fourier Transformation (DFT), or the inverse transformation. In signal analysis, time domain is a term to describe the changing of physical signals with respect to time. Frequency domain is used to describe the changing of physical signals with respect to frequency. Time domain and frequency domain provide two perspectives in analyzing a signal. Therefore, a DFT can be used to transform signals from one domain to a different domain. When the original signal is in time domain, the transformed signal can be in frequency domain. Likewise, an inverse DFT transforms an original signal in frequency domain to a signal in time domain.

In signal processing, a DFT is often utilized in transforming a digital or analog input signal in time domain, to a frequency domain data, thereby revealing the frequencies embedded in the input signal. A DFT transformation has a O(N2) complexity, meaning that processing a N number transformation requiring exponential amount of time to complete. In practice, DFT transformation can be efficiently performed with a FFT algorithm, which has an O(N log N) complexity, meaning that a transformation of N number requiring significantly less amount of time to complete.

Since any FFT algorithm can be easily adapted to perform inverse DFT, a FFT engine 120 can be utilized to implement an IFFT transformation. Thus, the IFFT engine 140 can be optional, and the OFDM engine 110 can depend on the FFT engine 120 in providing IFFT transformation. Alternatively, both the FFT engine 120 and the FFT engine 140 can be present in OFDM engine 110. Such an approach allows the FFT engine 120 to focus on performing FFT transformation, and the IFFT engine 140 to separately perform IFFT transformation, respectively.

In one embodiment, a single FFT engine 120 supports the processing of multiple types of OFDM signal 121-123. Alternatively, multiple FFT engines 120 can also be deployed to selectively support the multiple types of OFDM signal. Therefore, one FFT engine 120 can either support some of the OFDM types of signal, or support all types of OFDM signal. During processing, any one of the multiple types of signal 121-123 can be transmitted to the FFT engine 120. These different types of OFDM signal 121-123 may first be digitized by an Analog-to-Digital converter (ADC, not shown in FIG. 1), or may be pre-processed before being transmitted to the FFT engine 120. Signals 121-123 can be in time domain. Each of the time domain OFDM signals 121-123 may be embedded with signals of different frequencies. Therefore, the FFT engine 120 can transform multiple types of time domain signals to frequency domain, thus revealing the frequency information embedded in the input signals 121-123.

In one embodiment, the OFDM signals 121 are WIFI signals. WIFI refers to wireless local area network (WLAN) communication protocols that are defined in IEEE 802.11 standards. WIFI standards include 802.11a, 802.11b, 802.11g, etc. The GPS signals 122 are signals transmitted from one or more GPS satellites. GPS utilizes a network of satellites. Once a GPS receiver obtains signals from four or more GPS satellites that are in range, the current position of the GPS receiver can be calculated based on the information embedded in these satellite signals. Therefore, the GPS signals 122 are a combination of frequencies of signals.

In one embodiment, Bluetooth® signals 123 are signals transmitted from other Bluetooth devices. Bluetooth is a low power, short-range wireless technology that can be used to establish Personal Area Network (PAN). Bluetooth is standardized under IEEE 802.15, and is one of the OFDM types of signal. Bluetooth utilizes multiple channels of frequencies for frequency hopping, allowing sharing of these channels among multiple Bluetooth devices. Therefore, the Bluetooth signals 123 include a combination of frequencies from multiple channels. The list of OFDM signals in FIG. 1 is illustrative. Other types of OFDM signal that are supported by the FFT engine 120 can be PLC, WiMAX, etc.

In one embodiment, a Frequency Domain Signal Processing (FDSP) component 130 is present in the OFDM Engine 110. The FDSP 130 receives the frequency domain data generated by the FFT engine 120, and processes these frequency domain data according to different types of OFDM processing. Types of processing by the FDSP 130 include, but are not limited to, detecting symbols in the frequency domain stream, comparing frequency domain data to known GPS satellite reference signals for GPS satellite identifying, constructing Bluetooth messages from multiple channels, etc.

In one embodiment, an IFFT engine 140 is provided in the OFDM engine 110 to transform frequency domain data to OFDM signals 131-133. The frequency domain data can be directly transmitted from the FFT engine 120, or be processed by a FDSP 130 before being transmitted from the FDSP 130. In one embodiment, the IFFT engine 140 can be implemented by a FFT engine 120. The outputted OFDM signals 131-133 are in time domain, suitable for transmitting via a transmitter (Not shown in FIG. 1), or for additional time domain processing.

In one embodiment, a FFT engine 120 is designed to process a fixed number (points) of signal data at a time. Generally, a larger size FFT engine provides faster FFT transformation, but is more complex and has higher energy consumption. A smaller size FFT engine reduces complicity and energy consumption, but performs slower transformation. In situations when the signal transmission speed is less than the FFT engine processing speed, a small size FFT engine may be sufficient. Therefore, the size of a FFT engine 120 in an OFDM engine 110 is often determined by design requirements and compromises. On the other hand, different types of OFDM signals include different number of samples. For example, a WiFi signal maybe transmitted and received with a sample rate of 128 points; a sample rate for a GPS signal is likely in 1024 points; a sample rate of PLC signal is in 256 points; and a sample rate of WiMAX signal is in 2048 points. Therefore, in order to support different sized OFDM signals, a FFT engine 120 needs to accommodate signals that can be larger, or smaller, than its designed size.

Figure 2:
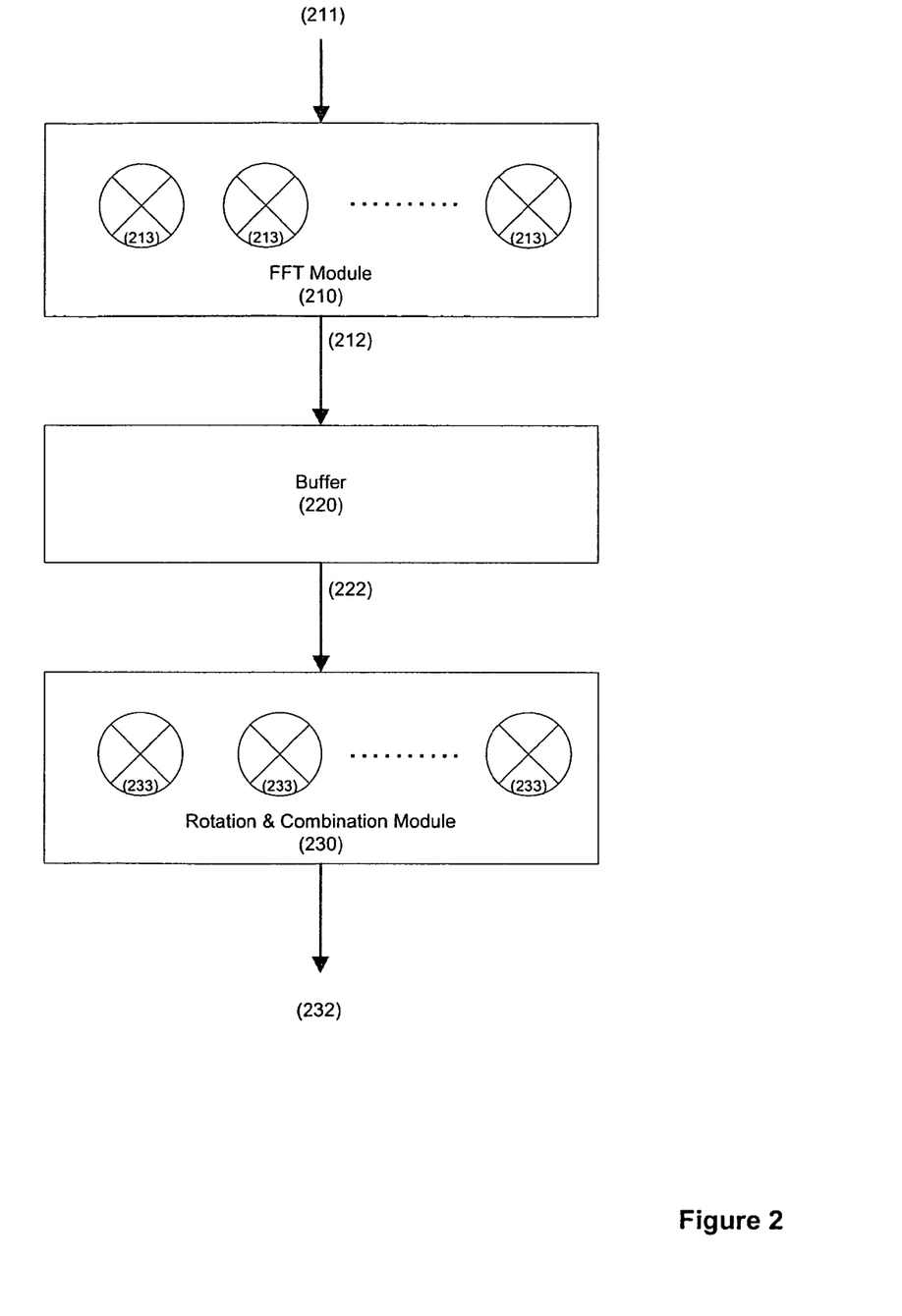
FIG. 2 illustrates an example of an FFT engine suitable for providing larger size FFT transformation.

FIG. 2 illustrates a FFT engine similar to the FFT engine 120 or the IFFT engine 140 of FIG. 1. The FIG. 2 FFT engine can be implemented to provide transformation of OFDM signals that are larger than the FFT engine processing size. In one embodiment, the FFT engine includes a FFT module 210, a FFT buffer 220, and a Rotation and Combination Module 230. The FFT module 210 includes multiple multipliers 213 to perform a FFT, or an IFFT, transformation on a time domain signal that is the same size as the FFT module 210.

In one embodiment, signal transmitted to the FFT engine of FIG. 2 is larger than the designed size of the FFT engine. Therefore, a mechanism is utilized to divide the incoming time domain signals to segments, each of which is equal to the size of the FFT engine. Segmentation of the time domain signals is further illustrated below. Once the time domain signal is divided into multiple segments each having the size of the FFT engines, these segments are sequentially transmitted to the FFT module 210 as a signal sequence 211 of FIG. 2.

In one embodiment, a signal sequence 211 is received by the FFT module 210. Each segment in the signal sequence 211 is of the same size as the FFT module 210. The FFT module 210 includes multiple multipliers 213 to perform a FFT or an IFFT transformation on the signals 211. For each of the segmented signals 211, the FFT module 210 transforms it to frequency domain data 212, and stores the transformed frequency domain data in a FFT buffer 220.

In one embodiment, the FFT buffer 220 is associated with the FFT module 210 to store the transformed frequency domain data 212. The FFT buffer 220 can be implemented with any memory or data storage techniques, and can be optional if the signal 212 is directly transmitted to Rotation and Combination Module 230 as signal 222 for further processing. In one embodiment, the FFT buffer 220 includes sufficient storage capacity for storing transformed frequency domain data equivalent to frequency domain data generated by a larger sized FFT engine. For example, when designing a FFT engine with a size of 128 points to process a GPS signal with 1024 points, the FFT buffer 220 should include sufficient size to store frequency domain data generated based on 1024 points of GPS time domain signal.

Figure 2A:
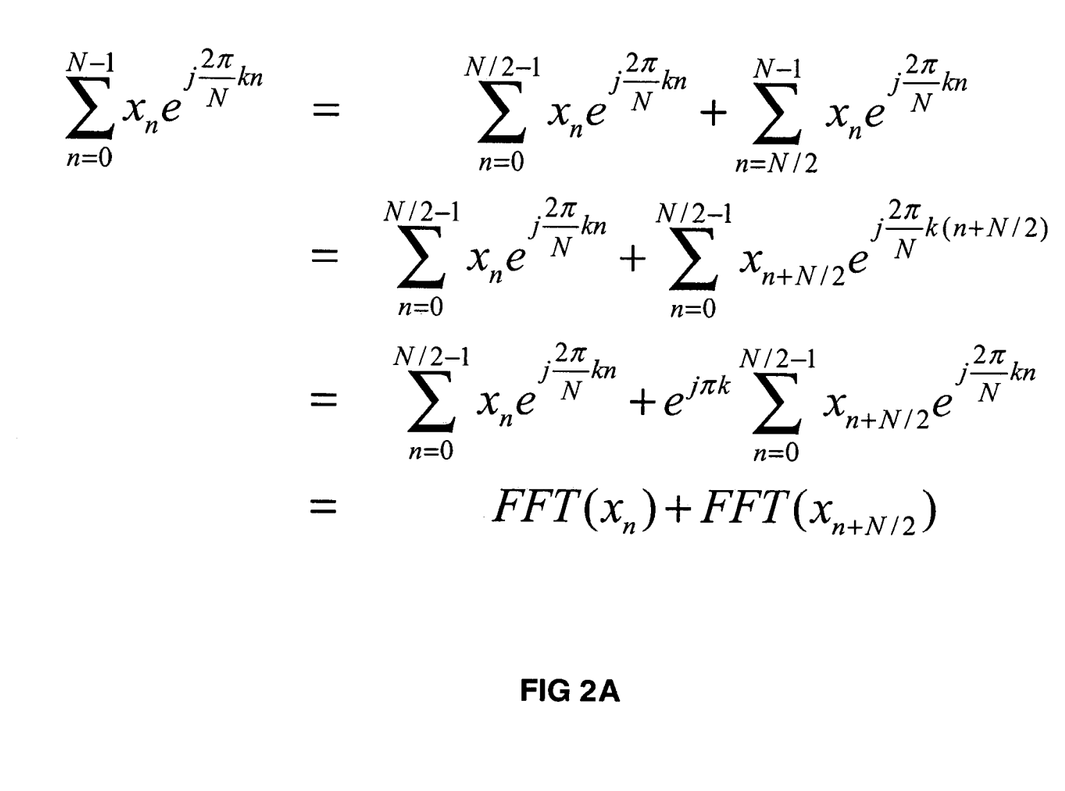
FIG. 2A illustrates an example of a non-overlapping FFT transformation formula.

In one embodiment, once the FFT buffer 220 includes sufficient frequency domain data, the frequency domain data 222 is transmitted to a Rotation and Combination Module 230. The Rotation and Combination Module 230 includes multiple multipliers 233 to rotate and combine the multiple segments of frequency domain data 222, and to output a frequency domain data 232 that is equivalent to the frequency domain data generated from a FFT engine with the same size as the received OFDM signal. Thus, a FFT engine as illustrated in FIG. 2 can be utilized to perform larger size FFT or IFFT transformation. FIG. 2A illustrate a formula that can be implemented by the FFT engine of FIG. 2.

In one embodiment, the FFT module 210 and Rotation & combination Module 230 performs larger size FFT processing by utilizing methods such as overlap-and-save, etc Alternatively, the segmented time domain signal 211 are not overlapped during segmentation and processing, meaning that each of the segment including information that is not duplicated in any other segments. Such an approach is advantageous because it does not require additional processing to eliminate or discard overlapped data.

Figure 3:
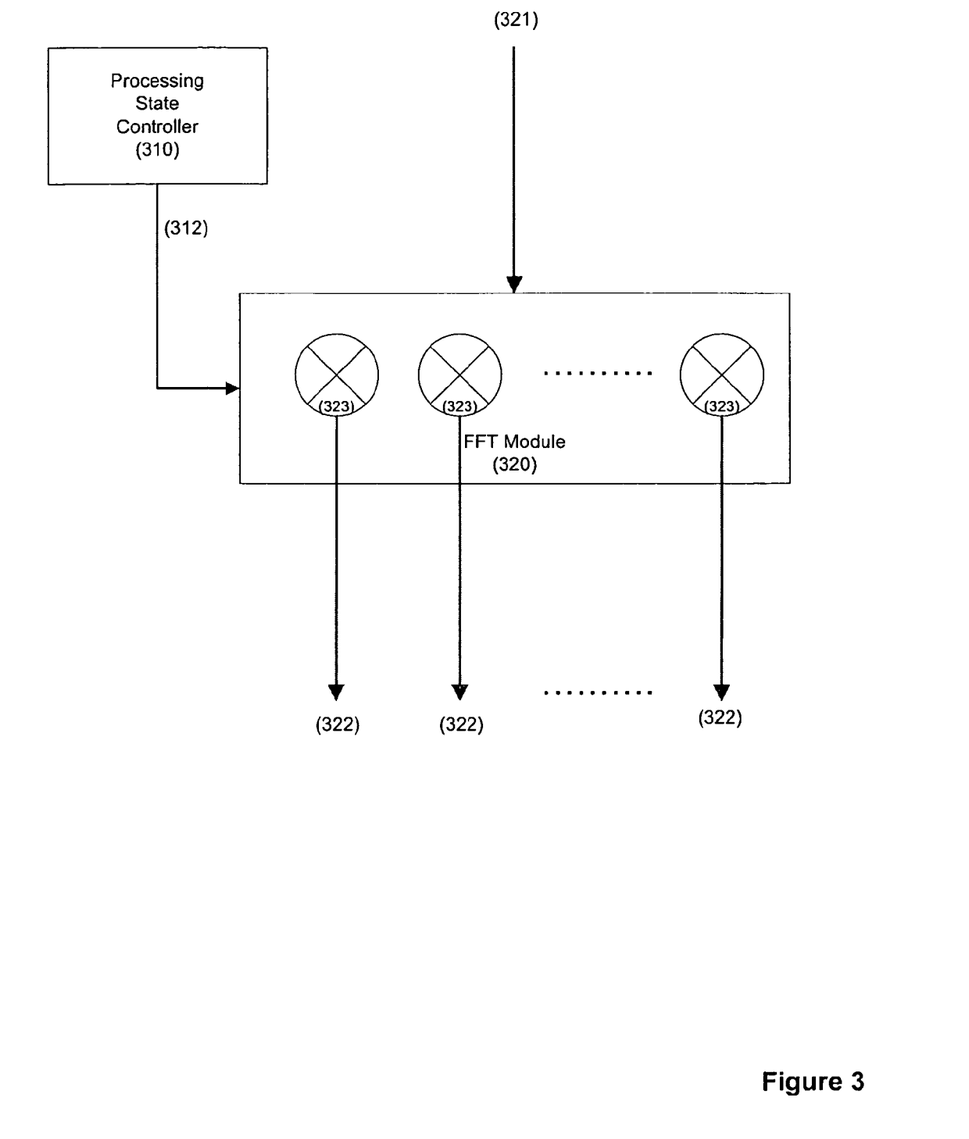
FIG. 3 illustrates an example of an FFT engine suitable for parallel FFT transformation.

FIG. 3 illustrates an example of a FFT engine that can be utilized to process time domain signals that are smaller than the size of FFT engine. For example, a FFT engine similar to the one in FIG. 3, which is designed with 1024 points for processing GPS signals, may be utilized to act as a 128 points FFT engine for processing WIFI signals. The FFT engine of FIG. 3 includes a Processing State Controller 310, and a FFT module 320 including multiple multipliers 323 therein.

In one embodiment, the Processing State Controller 310 includes a FFT state and a parallel state. The Processing State Controller 310 determines a state of processing based on the size of the input signals 321, and transmits the state information via 312 to the FFT module 320. When the input signals 321 is equal to or larger than the size of the FFT engine, the Processing State Controller 310 determines that the FFT engine to be run in a FFT state. The FFT engine running in the FFT state is similar to the FFT engine of FIG. 2. When the input signals 321 are smaller than the size of the FFT engine, the Processing State Controller 310 switches the FFT module 320 to a parallel state. In the parallel state, the FFT module 320 utilizes its multipliers 323 to perform parallel processing of the input signals 321.

In one embodiment, a time domain signal 321 is transmitted to multiple multipliers 323 of the FFT module 320. Each of the multipliers 323 performs identical FFT transformation on the received signal 321, and outputs multiple identical frequency domain data 322. The multiple identical frequency domain data 322 may be further parallel-processed. For example, a FFT engine of FIG. 3 with 2048 points may parallel-process a GPS signal with 1024 points. Thus one section of GPS signal can be transmitted as signal 321 to both a first half and a second half of the multipliers 323 of the FFT module 320. Two identical frequency domain data 322 may be generated from the FFT module 320, and can be utilized separately for detecting of GPS messages from two satellites. Alternatively, multiple, different sequences of time domain signal 321 can be transmitted to the multipliers 323, each of the multipliers 323 processing on one unique sequence of the time signal 321, and generating different frequency domain signals 322. Such approach is advantageous because it efficiently utilizes the additional transformation capability of the FFT engine in processing small-size signals.

Figure 4:
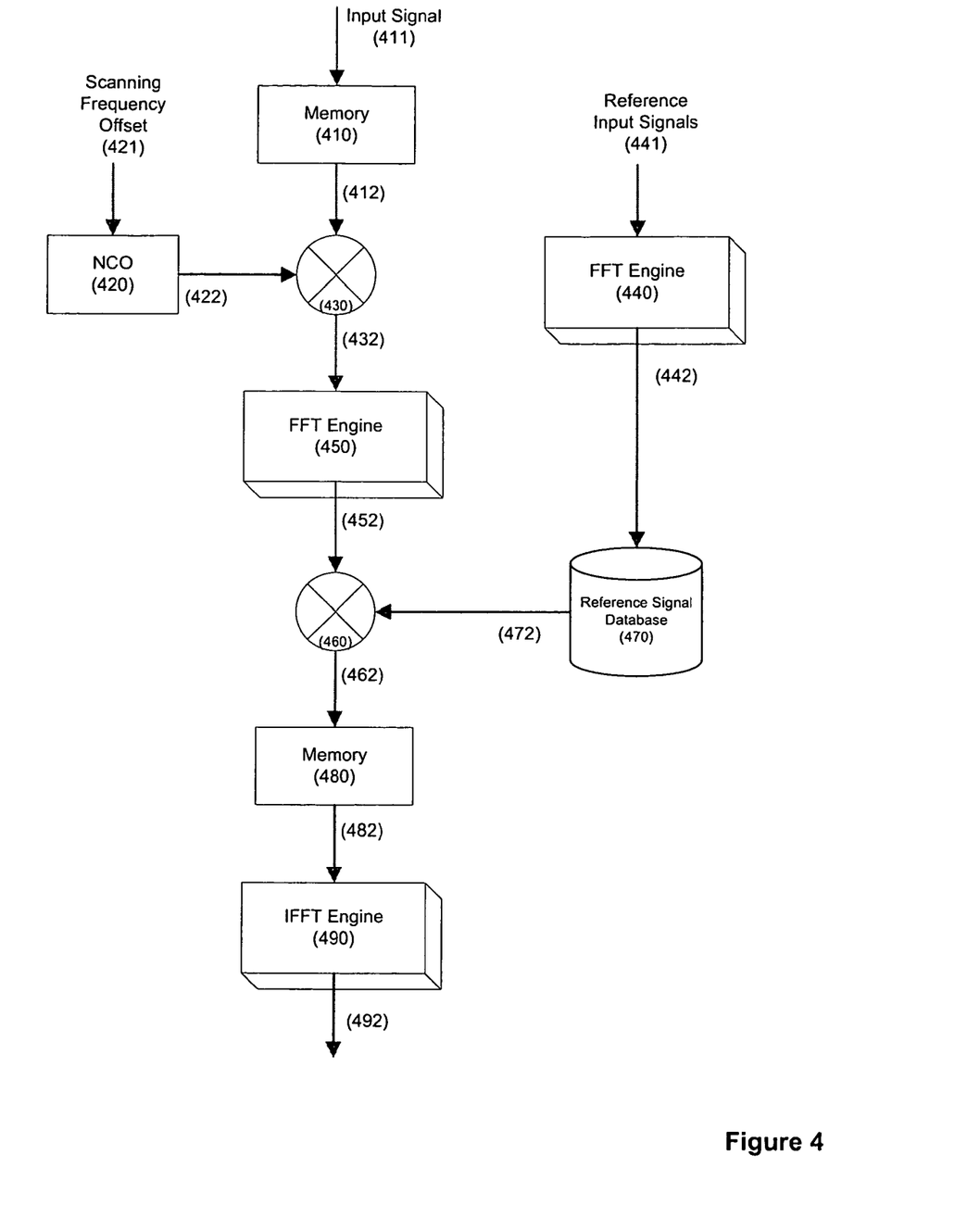
FIG. 4 illustrates an example of an implementation of an OFDM engine.

FIG. 4 illustrates an example of an implementation of an OFDM engine. The OFDM engine of FIG. 4 includes a memory 410, a Numerically-controlled Oscillator (NCO) 420, a multiplier 430, a FFT engine 440, a FFT engine 450, a multiplier 460, a Reference Signal Database 470, a memory 480 and an IFFT engine 490. The FFT engine 450 can be implemented by FFT engines of FIG. 2 or FIG. 3. In one embodiment as illustrated in FIG. 4, a FFT engine 450, an IFFT Engine 490, and an optional FFT engine 440 are 128 points FFT engines suitable for processing 128 points WIFI signals, and are also adapted to process 1024 GPS signals. During normal operations, the FFT engine 450 is functioning as a component of a WIFI engine in providing WIFI communication. When not in used for WIFI communication, the same FFT engine 450 can then be utilized for providing GPS signal processing and GPS satellite locking.

In one embodiment, input signal 411 is received by the OFDM engine of FIG. 4. The input signal 411 includes frequencies of signals generated from multiple GPS satellites. Once received via an antenna, the input signal 411 is converted from analog to digital via an ADC (not shown). The input signal 411 has a 1024 number size, which is larger than the FFT engine 450 size of 128 points. Further, the input signal 411 is in time domain, of complex signal wave forms.

In one embodiment, the digitized input signal 411 is stored in a memory 410. The memory 410 allows the storage of large amount of signals before processing. Alternatively, the memory 410 is optional, and the input signal 411 can be directly transmitted to multiplier 430. A scanning frequency offset 421 is transmitted to NCO 420. The scanning frequency offset 421 can be used by the NCO 420, along with multiplier 430, to segment the input signal stored in memory 410 to the same size as the FFT engine 450. The NCO 420 and multiplier 430 frequency-shift the input signal 412 to segment input signals 432, and transmit the segmented input signals 432 to the FFT engine 450. The FFT engine 450 performs larger size FFT transformation as illustrated above, and outputs the transformed frequency domain data 452 that is equivalent to the frequency domain data generated from a 1024-point FFT engine.

In one embodiment, multiple reference input signals 441 are pre-processed by a FFT engine 440 into reference frequency domain data 442. The reference frequency domain data 442 is then stored in a reference signal database 470. The multiple reference input signals 441 are signals from known GPS satellites. The above process is only performed once, since all the known satellites reference signals 441 are constant. Alternative, the reference frequency domain data 442 can be generated without using a FFT engine 440, and can be pre-stored in the reference signal database 470. In such an embodiment, FFT engine 440 becomes optional. Further, the reference signal database 470 may be optional if the FFT engine 440 provides reference frequency domain data 442 and directly transmits them to multiplier 460 in lieu of transmission 472.

In one embodiment, the frequency domain data 452 includes frequencies from all available satellites. Generally, a minimum of 4 satellites signals are required for calculating a location for a GPS receiver, and a maximum of 24 satellites signals may be present in the same frequency domain data 452. Thus the frequency domain data 452 can be multiplied with known reference frequency domain data 472 by multiplier 460 for correlation. Each of the reference data in the Reference Signal Database 470 is one-by-one correlated with the frequency domain data 452 for identifying of frequency from a known satellite. The multiplied data 462 can be stored in memory 480 for further processing. Alternatively, the memory 480 can be optional, and the frequency domain data 462, which includes correlated satellite reference information and other frequency components, can be directly transmitted to IFFT engine 490.

In one embodiment, the IFFT engine 490, which is also used in a WIFI engine for converting frequency domain WIFI data to time domain WIFI signals before transmission, is utilized for converting frequency domain GPS data 482 to time domain GPS data 492. As disclosed above, the frequency domain GPS data may include sample size that is larger than the size of IFFT engine 490. Thus, a FFT engine similar to the FFT engine of FIG. 2, which is adapted to perform larger size FFT transformation, may be utilized in process larger size IFFT transformation. When acting as an IFFT engine, the internal coefficients of the FFT engine 490 are slightly different from that of a FFT engine 450.

In one embodiment, the transformed time domain data 492 can be further processed for locating correlation peaks that are larger than a threshold. The location of such correlation peaks indicates locking of multiple GPS satellite signals. Therefore, by sharing a 128 point FFT engine in a WIFI system, the same WIFI system is adapted to provide GPS functionalities without adding redundant GPS components. Further, by taking advantage of the high processing speed of a FFT engine in a WIFI system, the time to acquire GPS signals can be order of magnitude smaller than the traditional GPS receivers.

Figure 5:
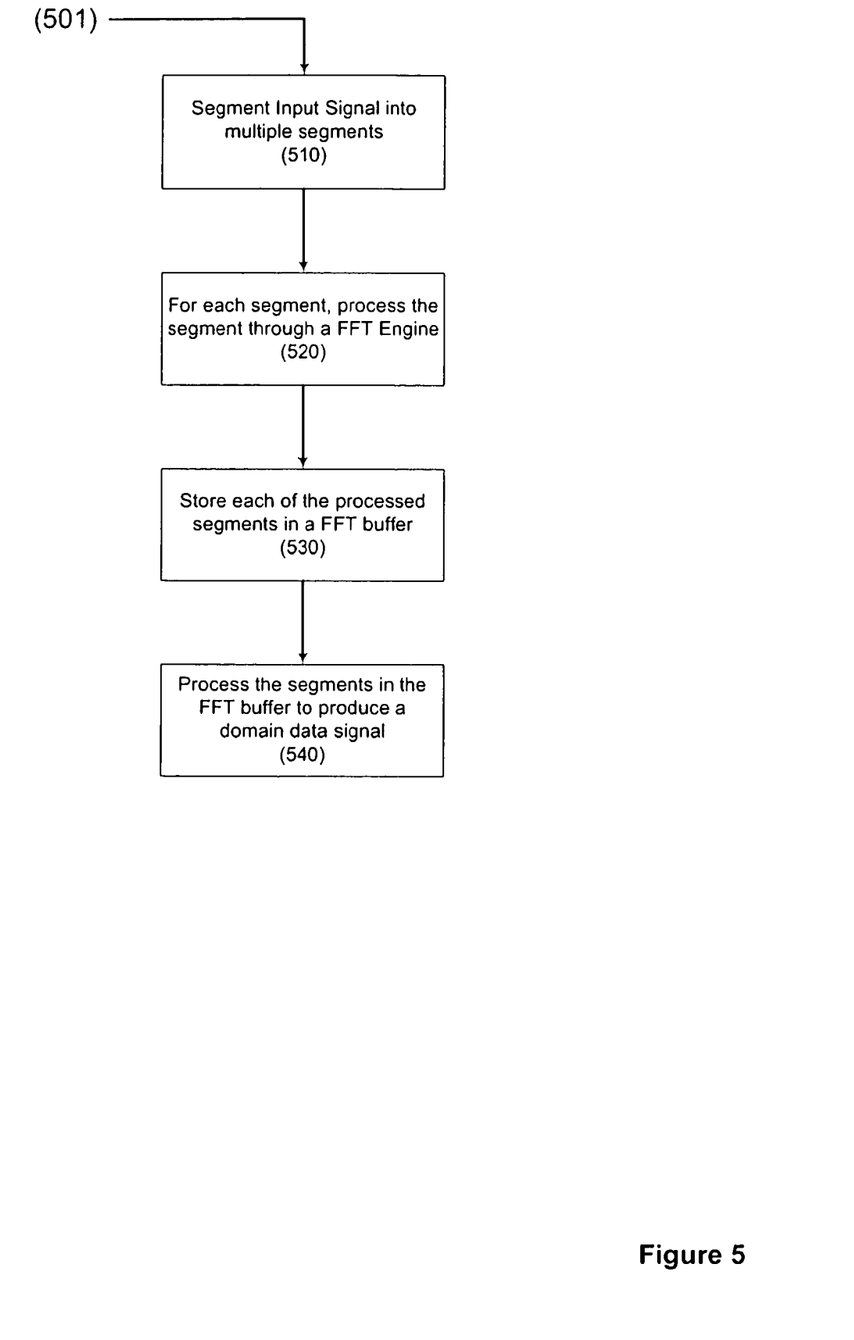
FIG. 5 illustrates an example of a flow diagram showing a process in providing larger size FFT transformation.

FIG. 5 illustrate an example of a process 501 in providing larger size FFT transformation with a fixed size FFT engine. The process 501 can be implemented in FFT engine 120, and IFFT engine 130 of FIG. 1.

Referring back to FIG. 5, at 510, an input signal, which is in time domain and includes multiple frequencies, is received. The input signal is segmented into multiple segments, each of the segment is of a size equal to the size of a FFT engine. At 520, for each of the segments, the segment is processed through a FFT engine to convert the time domain segment to frequency domain data. At 530, the processed segments in frequency domain are stored in a FFT buffer. And at 540, the segments in the FFT buffer, which are sufficient for producing a frequent domain data equivalent to a frequent domain data generated by a larger size FFT engine, are further processed to produce a frequency domain data signal.

Alternatively, at 510, an input signal in frequency domain is segmented into the size of an IFFT engine. For each of the frequency domain segment, the IFFT engine processes the segment at 520. The resulted time domain segments are stored in a FFT buffer at 530, and at 540, the segments are processed to produce a time domain signal that is equivalent to a time domain data generated by a larger size IFFT engine. In one embodiment, the processed segments in the FFT buffer are not overlapped among each other.

Figure 6:
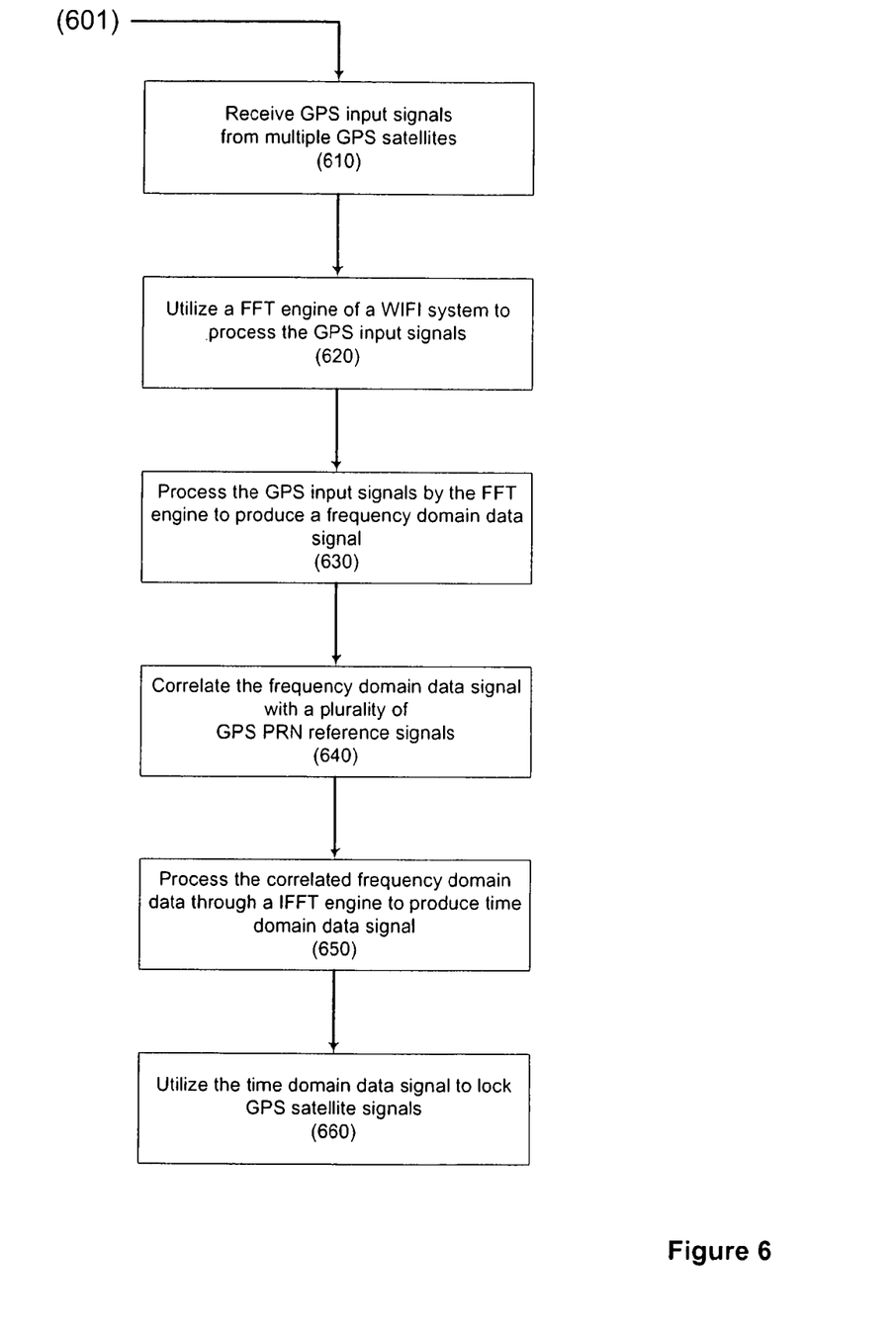
FIG. 6 illustrates an example of a flow diagram showing a process in utilizing a FFT engine of a WIFI system to provide GPS functionalities.

FIG. 6 illustrates an example of a process 601 in utilizing a FFT engine of a WIFI system to provide GPS functionalities. At 610, GPS input signals from multiple GPS satellites are received. At 620, the GPS input signals are transmitted to a FFT engine of a WIFI system. In one embodiment, the FFT engine has a size of 128 points, and the WIFI system is not currently providing WIFI communications. At 630, the FFT engine processed the GPS input signals, which are in time domain, to frequency domain data. The processing at 630 utilizes the process 501 as described in FIG. 5 in providing larger size FFT transformation with a fixed size FFT engine.

In one embodiment, at 640, the generate frequency domain data is correlated with a plurality of GPS PRN reference signals. The plurality of GPS PRN reference signals are known reference for GPS satellites, and can be previously generated via a FFT engine, or previously stored in a reference database. At 650, the correlated frequency domain data is processed through an IFFT engine to produce time domain data signals. The time domain data signals include correlation peaks. At 660, the time domain data signals can be utilized for detecting the correlation peaks and comparing the peaks to predefined thresholds for locking satellite signals.

Figure 7:
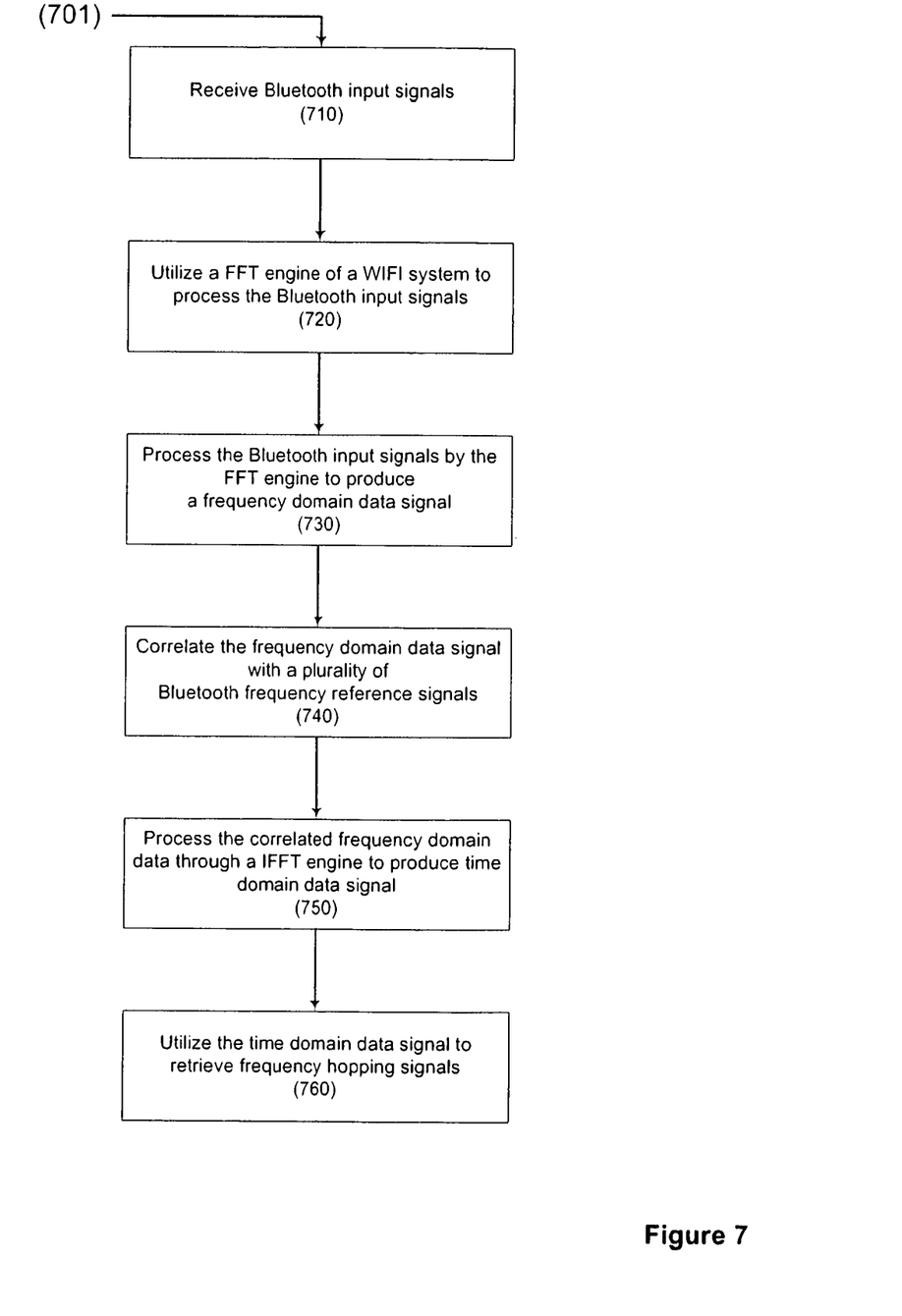
FIG. 7 illustrates an example of a flow diagram showing a process in utilizing a FFT engine of a WIFI system to provide Bluetooth functionalities.

FIG. 7 illustrates an example of a process 701 in utilizing a FFT engine of a WIFI system to provide Bluetooth functionalities. At 710, Bluetooth input signals, including multiple channel hopping frequencies, are received. At 720, the Bluetooth input signals are transmitted to a FFT engine of a WIFI system. In one embodiment, the FFT engine has a size of 128 points, and the WIFI system is not currently providing WIFI communications. At 730, the FFT engine processed the Bluetooth input signals, which are in time domain, to frequency domain data. The processing at 730 utilizes the process 501 as described in FIG. 5 in providing larger size FFT transformation with a fixed size FFT engine.

Referring back to FIG. 6, at 640, the generated frequency domain data is correlated with a plurality of Bluetooth reference signals. At 650, the correlated frequency domain data is processed through an IFFT engine to produce time domain data signals. The time domain data signals include Bluetooth messages from all 79 Bluetooth channels. At 660, the time domain data signals can be utilized for retrieving frequency hopping signals.

Thus, methods and systems for transactional failover a data set have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Although the present invention has been described with reference to specific examples of embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A system comprising:
   a fast Fourier transform (FFT) module in which an FFT is implemented;
   an FFT buffer coupled to the FFT module;

a rotation and combination module coupled to the FFT buffer;

wherein, in processing an input data signal that is larger than the FFT module, a first portion of the input data signal is transformed by the FFT module and stored in a first portion of the FFT buffer;

a second portion of the input data signal is transformed by the FFT module and stored in a second portion of the FFT buffer;

the rotation and combination module processes value stored in the first portion of the FFT buffer and the second portion of the FFT buffer to generate domain data; and;

a signal controller coupled to the FFT module, the signal controller having a FFT state and a parallel state;

wherein, in processing an input data signal being one of a plurality of types of OFDM signal, when the input data signal is larger than the FFT implemented in the FFT module, the signal controller is in the FFT state;

when the input data signal is smaller than the FFT implemented in the FFT module, the signal controller is in the parallel state, the input data signal being processed through a plurality of multiplier modules of the FFT module.

2. The system as recited in claim 1, wherein the input data signal is frequency-shifted before being processed through the plurality of multiplier modules of the FFT engine.

3. A method comprising:

segmenting an input data signal into a plurality of segments, the input data signal being one of a plurality of types of OFDM signal;

for each of the plurality of segments, processing the segment through a fast Fourier transform (FFT) engine, storing the processed segment to an FFT buffer;

combining the segments in the FFT buffer, wherein the combined segments are associated with domain data and;

multiplying the domain data signal with a stored reference signals to produce correlated frequency domain data.

4. The method as recited in claim 3, further comprising processing the correlated frequency domain data through an IFFT engine to produce a time domain data.

5. The method as recited in claim 3, wherein the input data signal includes a Bluetooth signal, further comprising extracting Bluetooth messages from multiple channels.

6. A method comprising:

segmenting an input data signal into a plurality of segments, the input data signal being one of a plurality of types of OFDM signal;

for each of the plurality of segments, processing the segment through a fast Fourier transform (FFT) engine, storing the processed segment to an FFT buffer;

combining the segments in the FFT buffer, wherein the combined segments are associated with domain data and;

wherein the input data signal includes a GPS signal and domain data includes frequency domain data, further comprising:

receiving the GPS signal from a GPS satellite; using a reference signal to correlate the GPS signal in frequency domain;

transforming the frequency domain data to time domain data; processing at least three other GPS signals;

determining location based upon the GPS signal and the at least three other GPS signals.

* * * * *